(12) United States Patent
Ashton

(10) Patent No.: US 9,080,903 B2
(45) Date of Patent: Jul. 14, 2015

(54) WATER RESISTANT AIRCRAFT PITOT DEVICE

(75) Inventor: Charles F. Ashton, Simi Valley, CA (US)

(73) Assignee: AeroVironment Inc., Monrovia, CA (US)

( * ) Notice: Subject to any disclaimer, the term of this patent is extended or adjusted under 35 U.S.C. 154(b) by 0 days.

(21) Appl. No.: 13/261,815

(22) PCT Filed: Aug. 16, 2012

(86) PCT No.: PCT/US2012/000357
§ 371 (c)(1),
(2), (4) Date: May 16, 2014

(87) PCT Pub. No.: WO2013/028220
PCT Pub. Date: Feb. 28, 2013

(65) Prior Publication Data
US 2014/0290383 A1  Oct. 2, 2014

Related U.S. Application Data

(60) Provisional application No. 61/575,419, filed on Aug. 19, 2011.

(51) Int. Cl.
*G01F 1/46* (2006.01)
*G01P 5/165* (2006.01)

(52) U.S. Cl.
CPC . *G01F 1/46* (2013.01); *G01P 5/165* (2013.01); *Y10T 29/49764* (2015.01)

(58) Field of Classification Search
CPC .......... G01F 1/46; G01F 15/08; G01L 1/2281
USPC ...................... 73/861.65, 861.66, 866.5, 200; 29/407.01
See application file for complete search history.

(56) References Cited

U.S. PATENT DOCUMENTS

| | | | |
|---|---|---|---|
| 3,702,566 A | 11/1972 | Obermaier et al. | |
| 3,769,835 A | 11/1973 | Obermaier et al. | |
| 5,438,880 A * | 8/1995 | Washburn | 73/861.65 |
| 6,591,696 B2 | 7/2003 | Bachinski | |
| 6,892,584 B2 | 5/2005 | Gilkison et al. | |
| 7,185,538 B2 * | 3/2007 | Hager et al. | 73/200 |
| 7,549,331 B1 | 6/2009 | Powell | |
| 7,716,980 B1 * | 5/2010 | Colten et al. | 73/170.02 |

OTHER PUBLICATIONS

"International Search Report and Written Opinion of the International Search Authority", mailed Oct. 22, 2012, for PCT application No. PCT/US2012/000357.

* cited by examiner

*Primary Examiner* — Lisa Caputo
*Assistant Examiner* — Nigel Plumb
(74) *Attorney, Agent, or Firm* — Eric J. Aagaard, Esq.; The Law Office of John A. Griecci

(57) ABSTRACT

A pitot tube system having a pitot tube containing a porous hydrophobic fabric that blocks water and contaminants from reaching a pressure sensor. The distance in the pitot tube between the fabric and a front orifice of the tube is less than 2.4 times the height of the orifice, and preferably less than or equal to 0.38 times the height. The section of the tube through which the fabric extends defines an opening characterized by a minimum dimension greater than 0.15 inches, and preferably being at least 0.21 inches. The tube is a removable structure that attaches to a mount that forms a passage for communicating the pressure in the tube. That passage contains a second porous hydrophobic fabric that also blocks water and contaminants from reaching a pressure sensor.

25 Claims, 6 Drawing Sheets

401

Configuring the housing with a tubular portion extending from the air-permeable fabric to the housing external orifice

403

Moisture testing the housing over the range of airspeeds to see if the tubing is subject to failure from aerodynamic water retention

405

If tubing is subject to failure from aerodynamic water retention, then reducing the ratio of the distance within the cavity between the air-permeable fabric and the housing external orifice, over the housing external-orifice height, and repeating steps (a) to (c)

FIG. 10

WATER RESISTANT AIRCRAFT PITOT DEVICE

This application claims the benefit of U.S. Provisional Application No. 61/575,419, filed Aug. 19, 2011, which is incorporated herein by reference for all purposes.

The present invention relates to a pitot device (e.g., a pitot tube) configured for use on an unmanned aerial vehicle to measure the airspeed of a flowing fluid.

BACKGROUND OF THE INVENTION

With reference to FIG. 1, pitot tubes are well known devices used in the calculation of the relative velocity of fluid flow relative to a body 9 (e.g., the velocity of the body through the fluid). A basic pitot tube generally consists of a base portion 11 and a barrel 13. The barrel typically is in the form of an extended hollow tube that faces directly into the direction of incoming fluid flow 15. The base portion supports and positions the barrel with respect to the body such that the fluid flow at the barrel is not affected by the body (e.g., the barrel is not within the boundary layer of the fluid flowing by the body).

Within the pitot tube, the flow of fluid is stopped, allowing for a pressure measurement of the stagnation pressure (also known as the total pressure), which is the sum of the static pressure and the dynamic pressure of the fluid flowing by the pitot tube. The pressure might be measured by a pressure sensor 17 in the pitot tube and transmitted by a wire 19, or the pressure might be measured in another location using a tube to put the pitot tube in fluid communication with that measurement location.

The static pressure can be separately measured at a static pressure port 21 that faces in a direction normal to the direction of fluid flow. The static pressure port can be in an entirely separate location, and use a separate pressure sensor 23 and wire 25 to report the static pressure.

With reference to FIG. 2, a pitot tube may alternatively be configured as a pitostatic tube. In this case, there is again a base 31 supporting a barrel 33. However, the pitot tube also includes a static port 35.

As was previously noted, the total pressure is the sum of the static and dynamic pressures. Under Bernoulli's equation, the dynamic pressure is a function of fluid velocity (and vice versa). Therefore, using an airspeed calculation processing system 27 (FIG. 1), the velocity may be calculated using the difference between the static and total pressures. The static and total pressures can be separately measured, as depicted in FIG. 1. Alternatively, as depicted in FIG. 2, the difference between the two can be directly sensed using a pressure sensor 37 set between two chambers, one being at the static pressure and the other being at the total pressure.

While there are many industrial uses for a simple pitot tube, these uses do not generally face the complexities presented to aircraft pitot tubes. On an aircraft, a pitot tube must be configured to deal with extreme variations in weather conditions, including rain, humidity and temperature. Moreover, because the calculation of airspeed is critical to safely operating an aircraft, the functionality of an aircraft pitot tube can literally be critical to the safety of the aircraft, its passengers and its cargo.

Referring again to FIG. 1, the barrel 13 of a typical pitot tube for a large aircraft might be ten inches long and a half inch wide. A distal end 41 of the barrel forms an opening that faces into the fluid flow, while a proximal end 43 is affixed to the base portion 11, which forms a pressure chamber 45 in fluid communication with the opening. The total pressure of the airflow may be measured within the pressure chamber. The pressure chamber may be provided with a comparatively small drain 47 at its gravitational bottom to allow for moisture to be drained when there is a pressure gradient between the tube pressure and the outside pressure. The drain is sized small enough allow the drainage without significantly impacting the total pressure measurement within the pressure chamber.

In some modern variations, pitot tubes may include complex arrangements of baffles and/or a variety of passages to provide for the total pressure, and in some cases static pressure, to be measured and/or compared. Also, active devices such as heaters may be used to prevent water from freezing prior to draining. As a result, complex pitot devices are sometimes used to help mitigate the possibility of blockage.

Because unmanned aerial vehicles ("UAVs") are sometimes substantially smaller than manned aircraft, and because they may fly at substantially lower airspeeds, pitot tubes for UAVs may face environmental problems not typically faced by their larger versions, such as from small airborne contaminants that could clog up a very small drain. Thus, the small pitot tubes on small unmanned aircraft are susceptible to failure from being exposed to water, or even very high humidity levels. Such small UAVs are used in both military field situations and civilian applications. Each of these applications can have important functions that cannot wait for inclement weather to improve.

In one approach to developing a small UAV pitot tube that is less susceptible to water-based malfunction, a membrane vent has been deeply embedded within a pitot tube between the barrel and the base portion. The membrane is a microporous expanded polytetrafluoroethylene membrane, and allows the free passage of gases and vapors, while water, dust, dirt, and such are repelled. Properly constructed, such a vent can even allow the pitot tube to be submerged without exposing the sensor to water. Moreover, it can filter out contaminants (e.g., dust and dirt) from the air while remaining operational. Unfortunately, while the addition of the membrane does block out water and contaminants, it does not eliminate water-based malfunctions of the pitot tube.

Accordingly, there has existed a need for a small UAV pitot device capable of functioning in a wide variety of weather conditions. Preferred embodiments of the present invention satisfy these and/or other needs, and provide further related advantages.

SUMMARY OF THE INVENTION

In various embodiments, the present invention solves some or all of the needs mentioned above, providing a small pitot device capable of functioning in a wide variety of weather conditions.

The pitot device, being configured for use in an airflow, includes a housing, an air-permeable fabric, a static port, a pressure measurement system including a pressure sensor, and an airspeed calculation system. The housing forms a cavity having a housing external orifice characterized by a housing external-orifice height. The air-permeable fabric is hydrophobic, and extends across a section of the cavity to define an internal chamber. The pressure sensor is configured to sense the difference between the pressure within the internal chamber and the pressure at a static port. The pressure measurement system is configured to gather information indicative of the difference between the pressure within the internal chamber and the pressure at the static port, while the airspeed calculation system configured to provide an airspeed indication based on the gathered information when the external orifice faces into the airflow and the static port is normal to the airflow.

The distance within the cavity between the air-permeable fabric and the housing external orifice (the barrel length) is less than 2.4 times the housing external-orifice height, and preferably is no more than 0.38 times the housing external-orifice height. Advantageously, smaller ratios of barrel length to orifice height limit the risk of flooding of the pitot tube in front of the hydrophobic fabric (i.e., viscous and/or aerodynamic forces on water within the tube causing the water to be retained in the tube and to cover the hydrophobic fabric). A further advantage of this device is that it is passive in that it does not require power (such as for a heater).

In another feature of the invention, the section of the cavity through which the fabric extends defines an opening to the internal chamber. The opening to the internal chamber is characterized by a minimum opening-size dimension (i.e., the minimum distance that can exist between two parallel lines extending on opposite sides of the opening without intersecting the opening) greater than 0.15 inches, and preferably is at least 0.25 inches. Advantageously, this prevents adhesion between the water and the structure around the hydrophobic fabric from causing water to gather and bridge across (i.e., cover completely) the hydrophobic fabric.

In yet another feature of the invention, the aircraft is characterized by a maximum standard angle of attack (i.e., angle of attack in a standard, steady-state flight condition). The portion of the housing between the air-permeable fabric and the housing external orifice extends as a generally tubular portion that is configured to be extend in a level orientation or lower (i.e., having an angle of attack that is no more than zero) when the aircraft is at its maximum standard angle of attack. Advantageously, this prevents the housing from filling with water (like a cup) while in a standard, steady-state flight condition.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 10 is a method embodying the invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them. Furthermore, there is no intent to be bound by any expressed or implied theory presented in this application.

Figure 3:
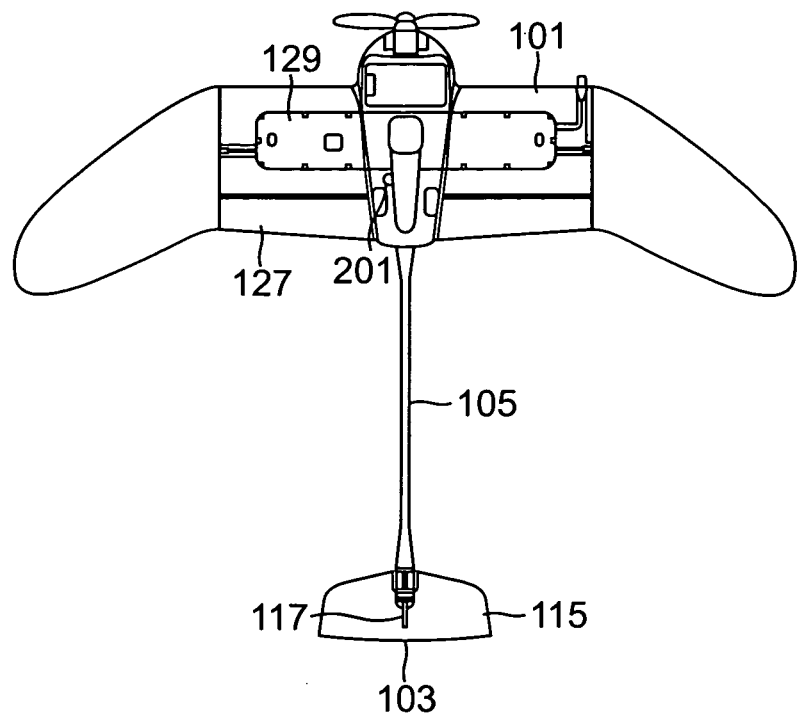
FIG. 3 is a plan view of an aircraft having a pitot tube system embodying the invention.
Figure 4:
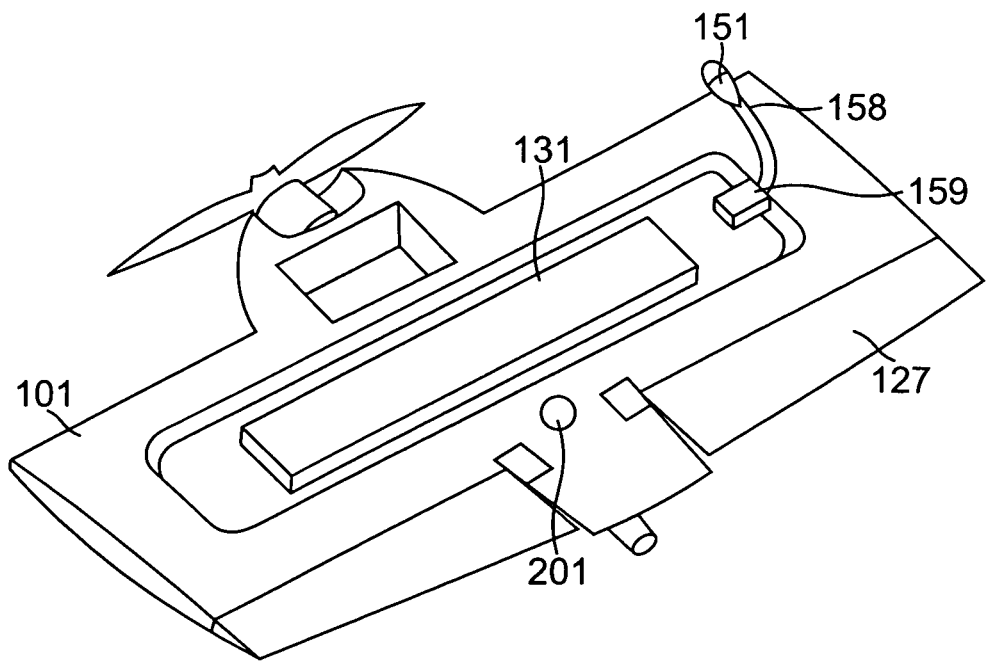
FIG. 4 is a partial perspective view of the aircraft of FIG. 3, with a cover to a control module removed.
Figure 5:
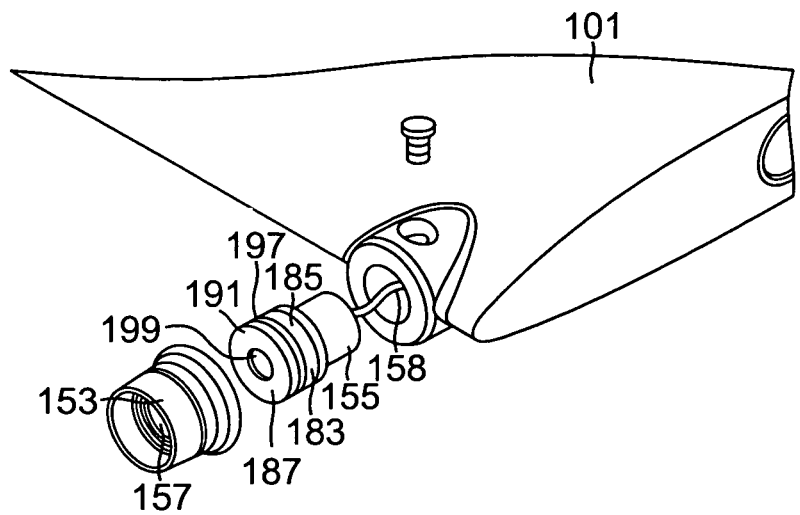
FIG. 5 is an exploded view of a pitot tube device that is part of the pitot tube system depicted in FIG. 3.
Figure 6:
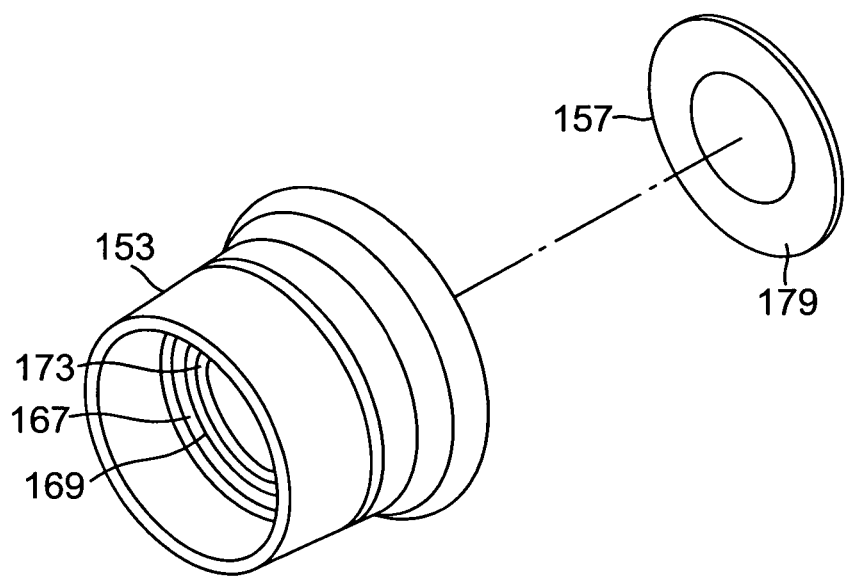
FIG. 6 is an exploded view of a housing and a section of hydrophobic fabric that are part of the pitot tube device depicted in FIG. 5.
Figure 7:
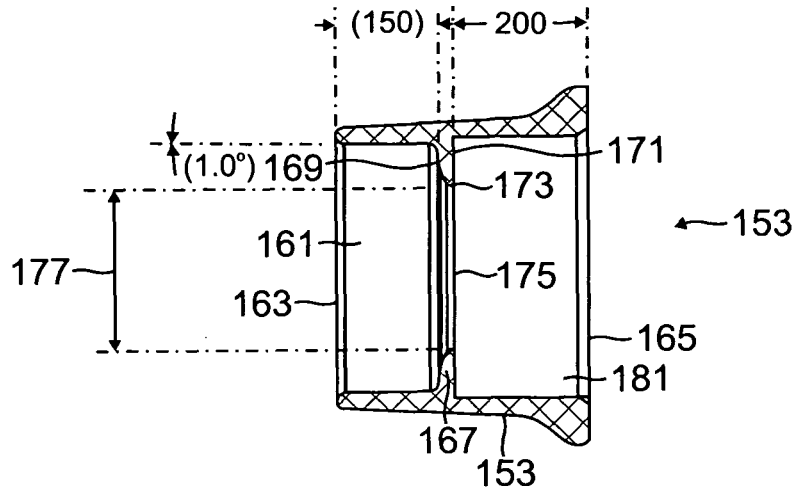
FIG. 7 is a cross-sectional view of the housing that is depicted in FIG. 6.

With reference to FIGS. 3 and 4, a first embodiment of a small, unmanned aircraft under the invention is configured with a wing 101 connected to an empennage 103 by a fuselage 105. Over the full flight envelope of the aircraft, the wing will operate at numerous relative airflow angles of attack. Nevertheless, the aircraft will have a limited range of standard, steady-state flight conditions in which the aircraft is intended to fly for extended periods of time, such as for level flight. These are not transitional flight conditions (e.g., turning, landing, or climbing), but rather are intended for long term use (e.g., cruising at altitude).

The range of standard flight conditions will have a limited range of angles of attack, extending from a minimum standard angle of attack to a maximum standard angle of attack. It is known for such standard, steady-state flight conditions to include some flight conditions with a positive aircraft angle of attack. The range of standard flight conditions will also define a vertical dimension for the aircraft (based on the orientation of gravity in the standard flight conditions).

The aircraft has a series of control surfaces. More particularly, the empennage 103 has one or more elevators 115 (i.e., a horizontal control surface) and a rudder 117 (i.e., a vertical control surface), the deflection of which are controlled by servos. Mounted on the wing are two ailerons 127, and a control module 129. The control module forms a single, watertight compartment that holds computer components 131 forming a control system for the aircraft.

With reference to FIGS. 3 to 7, mounted on the wing 101 is a portion of a pitot device 151. This device is simple and small, but is configured to overcome a number of problems relating to moisture and contaminants. The pitot device includes a housing 153, a housing mount assembly 155 and a first section of air-permeable fabric 157. The housing mount assembly is provided with a tube 158 that forms an airtight connection to a pressure sensor 159 within the control module 129.

The housing forms a tubular cavity 161 extending from a housing external orifice 163 at a front end of the housing, to a second, back opening 165 at a back end of the housing. The housing external orifice is round, and has a given internal diameter, but could have other shapes in variations of the embodiment. An important characteristic of the external orifice is its external-orifice height (i.e., the gravitationally vertical dimension of the orifice), as will be discussed later.

A section of the housing 153 is configured with an inner flange 167 extending inward around the periphery of the cavity at one longitudinal location of the housing. The housing inner flange 167 has a front face 169 and a back face 171. The back face is planar, while the front face tapers toward the back edge, meeting the back edge at a pointed radially inner edge 173 of the inner flange. This inner edge 173 forms a circular housing inner-flange opening 175. The inner-flange opening is characterized by a minimum opening-size dimension 177, which in this case is the diameter of the opening. In variations in which the opening is not circular, the minimum opening-size dimension 177 would be the minimum distance that can exist between two parallel lines extending on opposite sides of the opening without intersecting the opening.

The first section of air-permeable fabric 157 is affixed to the back face 171 of the housing inner flange 167 by a ring of adhesive 179 such that the fabric fully covers the inner-flange opening 175. This adhesive forms an adhesive connection that extends fully around the flange and fully around the first section of air-permeable fabric. The housing inner flange thus extends across a section of the cavity, and the inner flange and fabric define a front boundary of an internal chamber 181. The back opening 165 defines a back boundary of the internal chamber 181.

The first section of fabric 157 is a microporous expanded polytetrafluoroethylene membrane, which allows the transmission of air (and thus the communication of air pressure), but is very hydrophobic (i.e., it repels water). Thus, the inner chamber 181 can be exposed to the pressure on the opposite side of the first section of fabric, but not to moisture or contaminants on the opposite side of the first section of fabric.

The housing mount assembly 155 is configured as a hollow tubular portion 183 having an outer surface 185, and a housing mount assembly inner flange 187 extending inward around the periphery of the tubular portion 183 at a front end of the housing mount assembly to form a housing mount assembly inner-flange opening. The housing mount assembly inner flange 187 has a front face 191 and a back face.

The housing 153 is adapted to slidingly receive the housing mount assembly 155 through the back opening 165 such that the front face 191 of the housing mount assembly inner flange 187 is close to or adjoins the first section of air-permeable fabric 157 on the back face 171 of the housing inner flange 167. The outer surface 185 of the housing mount assembly forms a groove sized to receive an o-ring 197 that snugly affixes the inner and housing to the mount assembly with an airtight and watertight seal when the mount assembly is received within the housing.

A second section of air-permeable fabric 199 is affixed to the back face of the housing mount assembly inner flange 187 by an adhesive, such that the second section of fabric fully covers the housing mount assembly inner-flange opening. This adhesive connection extends fully around the flange. This second section of air-permeable fabric 199 is also a microporous expanded polytetrafluoroethylene membrane, which allows the transmission of air (and thus the communication of air pressure), but is very hydrophobic (i.e., it repels water). This second section serves as a redundant protection should the first one become compromised, or should the housing fall off of the aircraft.

The tube 158 is in fluid communication with the housing mount assembly 155, and that connection is airtight. As should be apparent, the internal chamber 181 is therefore in fluid communication with the total pressure of the air impacting the housing via the first section of air-permeable fabric 157, and is in airtight fluid communication with the pressure sensor 159 within the control module 129 via the tube 158. The pressure sensor is thereby exposed to the total pressure of the airflow impacting the housing and the first section of air-permeable fabric 157.

Figure 8:
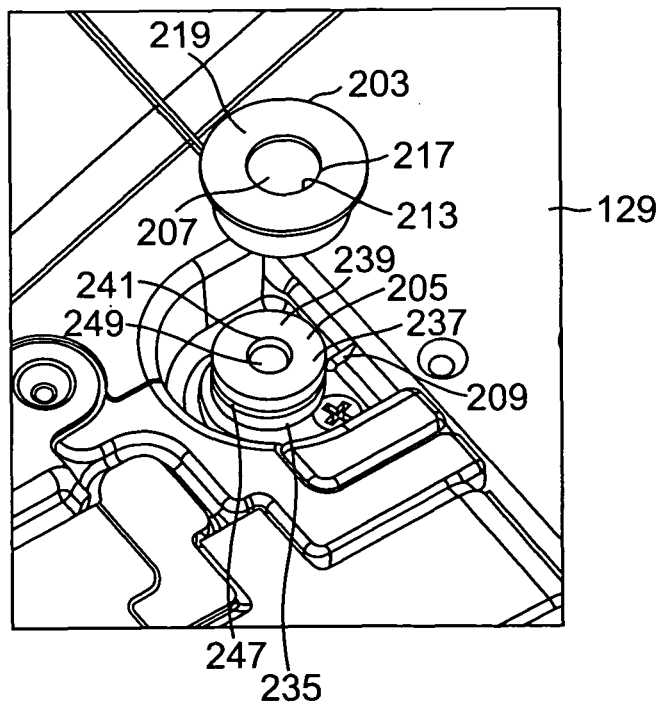
FIG. 8 is an exploded view of a static port device that is part of the pitot tube system depicted in FIG. 3.

With reference to FIGS. 3, 4 and 8, the pitot device further includes a static port 201 that is located appropriately on the aircraft to sense the static pressure of the passing air. The static port includes a static port body 203, a static port mount assembly 205, and a third section of air-permeable fabric 207. The static port mount assembly is provided with a tube 209 that forms an airtight connection to the pressure sensor 159 within the control module 129. The pressure sensor 159 is flexible, and positioned between the pressure of the internal chamber 181 and the static port pressure, thereby allowing it to sense the differential between the total pressure and the static pressure.

The body forms a tubular cavity having a body external orifice 213 at a front end of the body, and a second, back opening at a back end of the body. The front of the body 203 is configured with an inner flange 217 extending inward around the periphery of the cavity to form the body external orifice at the front of the body. The body inner flange 217 has a front face 219 and a back face. The back face is planar.

Similar to the flange 167 of the housing, the third section of air-permeable fabric 207 is affixed to the back face of the body inner flange 217 by an adhesive forming an adhesive connection such that the fabric fully covers the inner-flange opening 225. This adhesive connection extends fully around the flange and fully around the third section of air-permeable fabric. The third section of fabric 207 is a microporous expanded polytetrafluoroethylene membrane.

The static port mount assembly 205 is configured as a hollow tubular portion having an outer surface 235, and a static port mount assembly inner flange 237 extending inward around the periphery of the tubular portion at a front end 239 of the static port mount assembly to form a static port mount assembly inner-flange opening. The static port mount assembly inner flange 237 has a front face 241 and a back face.

The body 203 is adapted to slidingly receive the static port mount assembly 205 through the back opening such that the front face 241 of the static port mount assembly inner flange 237 is close to or adjoins the third section of air-permeable fabric 207 on the back face 221 of the body inner flange 217. The outer surface 235 of the static port mount assembly forms a groove sized to receive an o-ring 247 that snugly affixes the static port mount assembly and body to one another with an airtight and watertight seal when the static port mount assembly is received within the body.

A fourth section of air-permeable fabric 249 is affixed to the back face of the static port mount assembly inner flange 237 by an adhesive, such that the fourth section of fabric fully covers the static port mount assembly inner-flange opening. This adhesive connection extends fully around the flange. This fourth section of air-permeable fabric 249 is also a microporous expanded polytetrafluoroethylene membrane. This fourth section serves as redundant protection should the third one become compromised, or should the body fall off of the aircraft.

As should be apparent, the static port internal chamber is in fluid communication with the static pressure of the air passing by the body via the third section of air-permeable fabric 207, and is in fluid communication with the pressure sensor 159 within the control module 129 via the tube 209. The static port is also connected to a static port pressure sensor that is used for altitude calculations.

The control system of the embodiment is configured with a pressure measurement system configured to gather information indicative of the difference between the pressure within the housing internal chamber 181 (reflecting the total pressure) and the pressure at the static port 201 (reflecting the static pressure). The control system also includes an airspeed calculation system configured to provide an airspeed indication based on the gathered information when the external orifice faces substantially into the airflow and the static port faces substantially normal to the airflow.

In this embodiment, the pressure measurement system (including the pressure sensor) and the airspeed calculation system are subsystems of a general aircraft flight control system that is formed from the onboard electronics 131 and software. The flight control system can alternatively be contained in the electronics at a ground control station, or a combination of the ground control station and the onboard electronics 131. The aircraft flight control system also includes an autopilot configured to provide flight control information based on the airspeed indication provided by the airspeed calculation system The development of this invention was driven, at least in part, by a desire to use the hydrophobic fabric to protect the aircraft pressure sensors, and by concerns over the risk of pitot tube failure in conditions of rain and high humidity. Such a failure occurs if the pitot tube becomes plugged during flight. In such an occurrence, the indicated airspeed might increase with an increase in altitude, and decrease with a decrease in altitude. Such changes would cause an autopilot to try and adjust the airspeed by adjusting the pitch of the aircraft. If there is a small leak (e.g., from a drain), the indicated airspeed of a blocked pitot tube may drop toward zero, which will cause an autopilot to dive the aircraft in an attempt to regain airspeed.

In developing this embodiment, the applicant experimentally identified two fundamental mechanisms by which it appears failures may occur for very small (e.g., unmanned) aircraft using normal (i.e., long barreled) pitot tubes equipped with hydrophobic sensor protection. Not surprisingly, saturation of the fabric was not a failure mechanism, as the fabric is very hydrophobic.

One failure mechanism was that surface tension caused a water droplet to span the housing inner-flange opening 175 despite the fact that the fabric was hydrophobic. This bridging phenomenon appears to be because the housing inner flange is not as hydrophobic as the fabric. Experimentally, it was determined that a housing inner-flange opening 175 having a minimum opening-size dimension 177 of 0.125 inches would always fail. Also, it appeared that 0.15 inches was not large enough of a minimum opening-size dimension to completely avoid bridging.

A housing inner-flange opening characterized by a minimum opening-size dimension of 0.25 inches was large enough to avoid the bridging failure mechanism. It appears the critical size is slightly larger than 0.15 inches and smaller than 0.25 inches. It is believed that 0.21 inches might be at or close to the critical size over which the bridging failure mechanism may be avoided.

A second failure mechanism was determined to be that of an flooding of the tube to the extent that the fabric is covered by water. The net airflow into a pitot tube is substantially zero, which provides for the measuring of total pressure. Nevertheless, it was found that a substantial amount of circulation may occur within the barrel of the pitot tube, providing for moisture to enter the tube. Moreover, since water has a much greater mass (and thereby relative momentum), it may enter a pitot tube barrel even if the net airflow into the tube is zero.

Figure 9:
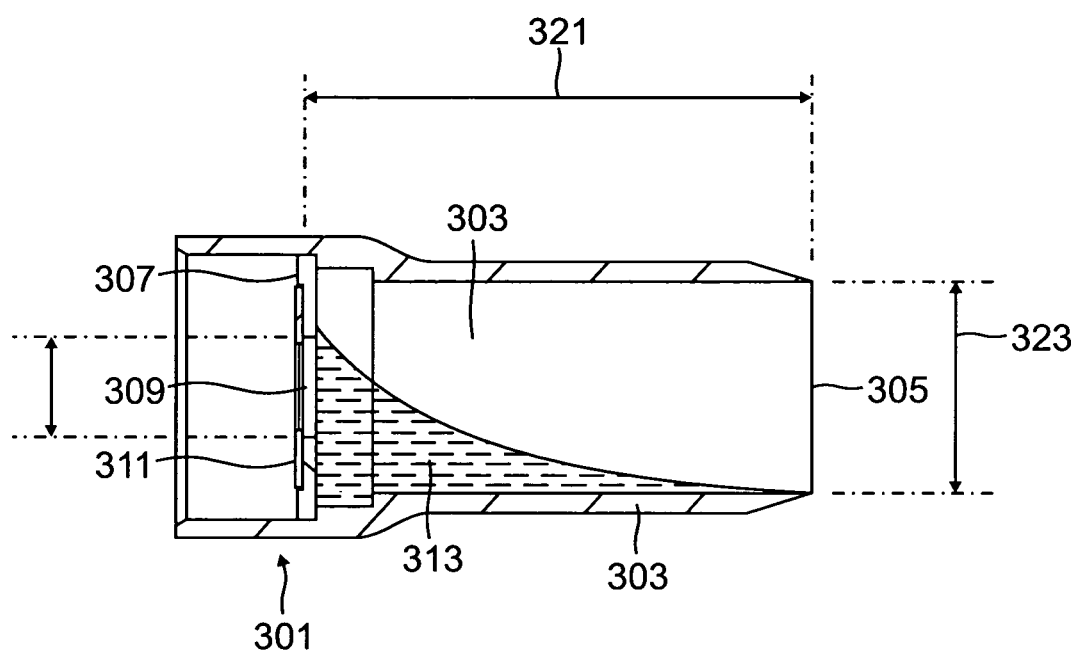
FIG. 9 is a cross sectional view of an experimental pitot tube housing that was tested by the applicant.

With reference to FIG. 9, in one test case, a pitot tube 301 having a long barrel 303 forming a cavity and having a housing external orifice 305 extending out in front of a housing inner flange 307 having an inner flange opening 309 leading to a hydrophobic air-permeable fabric 311 (at the back of the barrel) was tested. The pitot tube was exposed to blowing air and a spray of water. It was observed that water built up within the barrel, and was viscously drawn toward the fabric and/or aerodynamically pushed toward the fabric by the circulation of air within the barrel. As a result, a small body of water 313 was held in a curving wedge-shaped configuration, with the large side of the wedge against the inner flange (as depicted). When enough water accumulated in the small body of water, the large side of the wedge-shaped configuration was high enough to cover the inner flange opening 309 and fabric 311 (as depicted), and thereby plug the pitot tube.

Numerous pitot tube configurations were tested. Each pitot tube barrel was characterized by a barrel length 321 in front of the fabric 311, and by a height 323 of the housing external orifice 305. It was found that flooding could be avoided by adequately shortening the barrel length 321 in front of the fabric to provide for water to drain out the external orifice and thereby limit the size of the small body of water 313. It is believed that a barrel ratio, being the barrel length 321 in front of the air-permeable fabric 311, over the height 323 of the housing external orifice 305, is an appropriate characteristic to vary in overcoming a viscous and/or aerodynamic flooding failure mechanism.

It was found that a barrel ratio of approximately 2.4 did not avert the viscous and/or aerodynamic flooding problem, but that a barrel ratio of approximately 0.38 did avert the viscous and/or aerodynamic flooding problem. Thus, under the invention, the distance within the cavity between the inner flange and the housing external orifice is less than 2.4 times the housing external-orifice height, and preferably less than or equal to 0.38 times the housing external-orifice height.

It should be noted that the barrel ratio could be reduced all the way to 0.00 within the scope of the invention. Nevertheless, there are reasons that it is preferable to have a ratio that is greater than 0.00. First, the barrel will provide some physical protection to the air-permeable fabric, particularly while the aircraft is being handled on the ground. Such fabrics may be sensitive to scratching, and could lose their protective qualities if damaged. Second, the presence of the barrel in front of the fabric allows for a relatively low-tech method of testing the operation of the pitot device.

In particular, if a user's finger is pressed against the housing external orifice 305, it will increase the pressure within the chamber and make the aircraft appear to have an airspeed (i.e., greater than zero). To prevent the finger from damaging the fabric, the barrel must be long enough to prevent the finger from coming in contact with the fabric. Thus, under the invention, the distance within the cavity between the inner flange and the housing external orifice is preferably greater than 0.00 times the housing external-orifice height (i.e., the distance within the cavity between the inner flange and the housing external orifice is preferably greater than 0.00), and preferably large enough to prevent the fingers of most adults from touching the fabric when pressing their finger over the external orifice.

As was previously described, the aircraft has a limited range of standard flight conditions in which the aircraft is intended to fly for extended periods of time, such as for level flight. This range of standard flight conditions will have a limited range of angles of attack, extending from a minimum standard angle of attack to a maximum standard angle of attack. It should be noted that if the pitot tube is angled significantly upward when the aircraft is in a standard angle of attack, then a certain amount of water will be gravitationally trapped in the barrel, exacerbating the possibility of viscous and/or aerodynamic flooding. Therefore, it may be preferable to configure the pitot tube to be in a level orientation or lower (i.e., having a pitot tube angle of attack, being the angle of the pitot tube barrel with respect to the wind, defined as positive when the wind is striking the bottom of the pitot tube and negative when the wind is impacting the top of the pitot tube that is no more than zero) when the aircraft is at or close to its maximum standard angle of attack.

Figure 1:
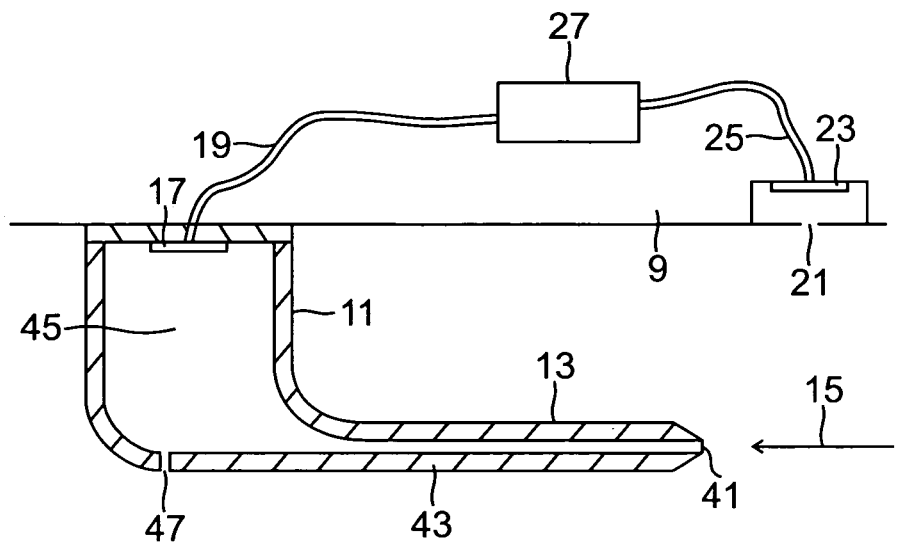
FIG. 1 is a cross-sectional view of a first PRIOR ART pitot tube system.
Figure 2:
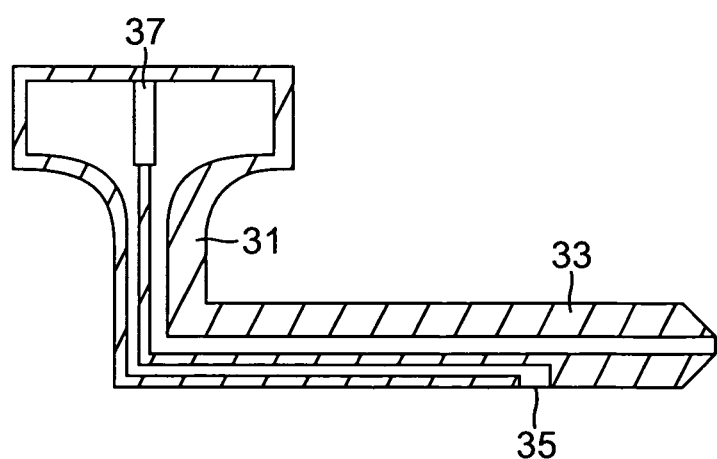
FIG. 2 is a cross-sectional view of a second. PRIOR ART pitot tube system.

It should be noted that this system uses a single pressure differential sensor system rather than two separate sensors. The pressure differential sensor is mounted with the avionics inside the waterproof control module 129. It is within the scope of the invention to use two separate pressure sensors to establish the pressure differential between two chambers, and thereby to determine the pressure differential (as was previously discussed with reference to FIG. 1).

With reference to FIG. 10, the invention is also embodied in a method of designing a pitot device for use in an airflow over a range of airspeeds. As was described above, the pitot device includes a housing, an air-permeable fabric, a static port structure, a pressure measurement system including a pressure sensor, and an airspeed calculation system. The housing forms a cavity having a housing external orifice characterized by a housing external-orifice height. The air-permeable fabric is configured to extend across a section of the cavity and define an internal chamber. The pressure sensor is configured to sense the pressure differential between the internal chamber pressure and a static port pressure over the range of airspeeds. The pressure measurement system is configured to gather information indicative of the difference between the pressure within the internal chamber and the pressure at the static port. The airspeed calculation system is configured to provide an airspeed indication based on the gather information when the external orifice faces into the airflow and the static port is normal to the airflow.

The method includes the steps of:

(a) configuring the housing with a tubular portion extending from the air-permeable fabric to the housing external orifice 401;

(b) moisture testing the housing over the range of airspeeds to see if the tubing is subject to failure from viscous and/or aerodynamic flooding 403; and (c) if tubing is subject to failure from viscous and/or aerodynamic flooding, then reducing the ratio of the distance within the cavity between the air-permeable fabric and the housing external orifice, over the housing external-orifice height, and repeating steps (a) to (c) 405.

It is to be understood that the invention comprises a pitot system apparatus and methods for designing and producing a pitot system apparatus. Alternate variations of these embodiments could comprise other types of systems for measuring the pressure differential between the static pressure and the total pressure. For example, the two pressures could be separately measured (as is known in the art). In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A pitot device for use in an airflow, comprising:
a pitot housing forming a cavity having a housing external orifice characterized by a housing external-orifice height;
an air-permeable fabric extending across a section of the cavity and defining an internal chamber; and
a pressure sensor configured to sense information regarding the pressure within the internal chamber;
wherein the distance within the cavity between the air-permeable fabric and the housing external orifice is less than 2.4 times the housing external-orifice height.

2. The pitot device of claim 1, and further comprising:
a static port; and
an airspeed calculation system configured to provide an airspeed indication based on the gather information when the external orifice faces into the airflow and the static port is normal to the airflow;
wherein the pressure sensor is part of a pressure measurement system configured to gather information indicative of the difference between the pressure within the internal chamber and the pressure at the static port.

3. An aircraft control system, comprising an autopilot and the pitot device of claim 2, wherein the autopilot is configured to provide flight control information based on the airspeed indication provided by the airspeed calculation system.

4. The pitot device of claim 1, wherein the distance within the cavity between the air-permeable fabric and the housing external orifice is no more than 0.38 times the housing external-orifice height.

5. The pitot device of claim 1, wherein the distance within the cavity between the air-permeable fabric and the housing external orifice is greater than 0.00 times the housing external-orifice height.

6. The pitot device of claim 1, wherein the section of the cavity through which the fabric extends defines an opening to the internal chamber, and wherein the opening to the internal chamber is characterized by a minimum opening-size dimension greater than 0.15 inches.

7. The pitot device of claim 6, wherein the minimum opening-size dimension is at least 0.21 inches.

8. The pitot device of claim 7, wherein the minimum opening-size dimension is at least 0.25 inches.

9. The pitot device of claim 1, and further comprising a second air-permeable fabric covering the static port.

10. The pitot device of claim 9, wherein the pressure measurement system includes a single pressure sensor configured to measure the pressure differential between the pressure in the internal chamber and the pressure at the static port.

11. The pitot device of claim 1, wherein the housing does not form a drain hole.

12. The pitot device of claim 1, wherein the air-permeable fabric is hydrophobic.

13. The pitot device of claim 1, and further comprising a second air-permeable fabric covering the static port, wherein:
the pressure measurement system includes a single pressure sensor configured to measure the pressure differential between the pressure in the internal chamber and the pressure at the static port;
the distance within the cavity between the air-permeable fabric and the housing external orifice is approximately 0.38 times the housing external-orifice height; and
the section of the cavity through which the fabric extends defines an opening to the internal chamber, and the opening to the internal chamber is characterized by a minimum opening-size dimension greater than 0.15 inches.

14. The pitot device of claim 13, wherein the minimum opening-size dimension is at least 0.21 inches.

15. The pitot device of claim 13, wherein the minimum opening-size dimension is at least 0.25 inches.

16. The pitot device of claim 13, wherein the housing does not form a drain hole.

17. The pitot device of claim 13, wherein the air-permeable fabric is hydrophobic.

18. A pitot device for use in an airflow, comprising:
 a housing forming a cavity having a housing external orifice characterized by a housing external-orifice height;
 an air-permeable fabric extending across a section of the cavity and defining an internal chamber;
 a static port;
 a pressure measurement system configured to gather information indicative of the difference between the pressure within the internal chamber and the pressure at the static port, the pressure measurement system including a pressure sensor configured to sense information regarding the pressure within the internal chamber; and
 an airspeed calculation system configured to provide an airspeed indication based on the gather information when the external orifice faces into the airflow and the static port is normal to the airflow;
 wherein the section of the cavity through which the fabric extends defines an opening to the internal chamber, and wherein the opening to the internal chamber is characterized by a minimum opening-size dimension greater than 0.15 inches.

19. The pitot device of claim 18, wherein the minimum opening-size dimension is at least 0.21 inches.

20. The pitot device of claim 19, wherein the minimum opening-size dimension is at least 0.25 inches.

21. The pitot device of claim 19, wherein the pressure measurement system includes a single pressure sensor configured to measure the pressure differential between the pressure in the internal chamber and the pressure at the static port.

22. The pitot device of claim 18, and further comprising a second air-permeable fabric covering the static port.

23. The pitot device of claim 18, wherein the housing does not form a drain hole.

24. The pitot device of claim 18, wherein the air-permeable fabric is hydrophobic.

25. A method of designing a pitot device for use in an airflow over a range of airspeeds, the pitot device including a housing forming a cavity having a housing external orifice characterized by a housing external-orifice height, an air-permeable fabric configured to extend across a section of the cavity and define an internal chamber, a static port structure, a pressure measurement system configured to gather information indicative of the difference between the pressure within the internal chamber and the pressure at the static port, the pressure measurement system including a pressure sensor configured to sense information regarding the pressure within the internal chamber over the range of airspeeds, and an airspeed calculation system configured to provide an airspeed indication based on the gather information when the external orifice faces into the airflow and the static port is normal to the airflow, comprising the steps of:

(a) configuring the housing with a tubular portion extending from the air-permeable fabric to the housing external orifice;

(b) moisture testing the housing over the range of airspeeds to see if the tubing is subject to failure from flooding; and (c) if tubing is subject to failure from flooding, then reducing the ratio of the distance within the cavity between the air-permeable fabric and the housing external orifice, over the housing external-orifice height, and repeating steps (a) to (c).

\* \* \* \* \*